United States Patent
Nomura

[19]

[11] Patent Number: 5,825,509
[45] Date of Patent: Oct. 20, 1998

[54] IMAGE PROCESSING DEVICE WITH ERROR-DIFFUSION QUANTIZATION FUNCTION

[75] Inventor: Mayumi Nomura, Yokkaichi, Japan

[73] Assignee: Brother Kogyo Kabushiki Kaisha, Nagoya, Japan

[21] Appl. No.: 535,336

[22] Filed: Sep. 28, 1995

[30] Foreign Application Priority Data

Oct. 7, 1994 [JP] Japan ................................. 6-244287

[51] Int. Cl.⁶ ............................................ H04N 1/40
[52] U.S. Cl. ....................... 358/456; 358/457; 358/465; 358/466; 382/270; 382/274
[58] Field of Search ................................. 358/456, 457, 358/458, 460, 298, 455, 465, 466, 447; 382/270, 274, 252

[56] References Cited

U.S. PATENT DOCUMENTS

| | | | |
|---|---|---|---|
| 4,680,645 | 7/1987 | Dispoto et al. | |
| 4,809,082 | 2/1989 | Yamaguchi et al. | 358/447 |
| 5,121,447 | 6/1992 | Tanioka et al. | 358/466 |
| 5,204,760 | 4/1993 | Murayama et al. | 358/456 |
| 5,216,753 | 6/1993 | Ng | 395/182 |
| 5,325,211 | 6/1994 | Eschbach | 358/466 |
| 5,394,250 | 2/1995 | Shono | 358/447 |
| 5,402,245 | 3/1995 | Motta et al. | |
| 5,515,456 | 5/1996 | Ballard | 382/252 |
| 5,519,509 | 5/1996 | Hikosaka et al. | 358/456 |
| 5,539,843 | 7/1996 | Murakami et al. | 382/270 |
| 5,610,999 | 3/1997 | Bannai et al. | 358/457 |

OTHER PUBLICATIONS

IEEE Spectrum, Bell Telephone Laboratories, Inc., Mar. 1969, "Images from computers", Schroeder, pp. 67–79.
Computer Graphics and Image Processing 5, 13–40 (1976), Bell Laboratories, New Jersey, US, "A survey of Techniques for the Display of Continuous Tone Pictures on Bilevel Displays", J>F Jarvis et al., pp. 13–40.
"Graduation Processing", *Basics of Imaging Technology*, (1991).
Robert W. Floyd, et al, "An Adaptive Algorithm for Spatial Greyscale", *Proceeding of the S.I.D.* vol. 17/2 Second Quarter (1976) pp. 75–76.
"Dithering Method" Electronic Image Association Report, vol. 10, No. 5 (1981), pp. 388–397.

*Primary Examiner*—Edward L. Coles
*Assistant Examiner*—Mark Wallerson
*Attorney, Agent, or Firm*—Oliff & Berridge PLC

[57] ABSTRACT

An error-diffusion quantization process is conducted on all the pixels of a continuous tone image, pixel by pixel. In the error-diffusion quantization process to an object pixel, a threshold value T is randomly set for the object pixel. Input density data $I_{x,y}$ of the object pixel is modified by a sum of quantization errors E distributed to the object pixel during error-diffusion quantization processes previously performed for preceding nearby pixels. The modified input density $I'_{x,y}$ of the object pixel is compared with the threshold value T set for the object pixel, whereby the input density data of the object pixel is converted into a quantized output data Ie. A quantization error "e" between the modified input density $I'_{x,y}$ and the quantized output data Ie is determined. The quantization error "e" is distributed to subsequent nearby pixels, which have not yet been quantized, with the use of the weight coefficient matrix α.

20 Claims, 4 Drawing Sheets

IMAGE PROCESSING DEVICE WITH ERROR-DIFFUSION QUANTIZATION FUNCTION

BACKGROUND OF THE INVENTION

1. Field of the Invention

The present invention relates to an image processing device provided with a function for quantizing an original continuous tone image to produce a pseudo-continuous tone image.

2. Description of the Related Art

The image processing device capable of quantizing an original continuous tone image can be applied to a multilevel image forming device that can form an image with a predetermined number of tone levels less than the number of tone levels constructing the original continuous tone image. The image processing device quantizes the tone levels of the original continuous tone image into the predetermined number of tone levels, to thereby produce a pseudo-continuous tone image data. The multilevel image forming device forms a pseudo-continuous tone image in accordance with the pseudo-continuous tone image data.

For example, the image processing device can be applied to a bilevel image forming device that can form an image from presence or absence of dots. The image processing device quantizes or binarizes an original continuous tone image into pseudo-continuous tone image data constructed from two tone levels. The bilevel image forming device forms a binary image in accordance with the pseudo-continuous tone image data. Typical examples of the bilevel image forming device includes digital photoelectric copy machines, thermal-transfer printers, ink jet printers, and the like.

Dithering is one conventional method for quantizing an original continuous tone image to produce a pseudo-continuous tone image. In an ordered-dither technique, images are quantized according to a threshold matrix (dither matrix) table. A large matrix table is required to accurately reproduce original tones. On the other hand, a small matrix table is required to obtain high resolution of images. Because of these conflicting requirements, it has been difficult to obtain both good tone reproducibility and high resolution.

Error diffusion (ED) is one conventional method that obtains both good tone reproducibility and high resolution with relative success. When error diffusion is applied to a bilevel device, each picture element (pixel) is first compared to a predetermined threshold value, for example, an intermediate value within a range of pixel densities. Pixels that fall above the threshold result in a dot and those below result in no dot. The difference or error between the intensity of the original pixel and the output value is "diffused" to neighboring pixels to modify the error. A subsequent pixel, that has had its value modified, is then compared to the threshold value, and then judged to be a dot or none dot based on the compared result. All pixels are serially compared to the threshold value while being modified by error derived while processing preceding pixels.

In the following example, it will be assumed that each pixel is inputted at a density with an integral value within the range of 0 through 255 and is outputted at a value of either 0 or 255. After quantization processes, the distribution of output value should be the same throughout a uniformly dense region A wherein inputted density is the same throughout the region. However, an artificial border is sometimes generated in the uniform region A where the positional pattern of the two output values changes as described below.

As an example, consider a uniform density region B throughout which the input density is 128. During binarization processes, half of the pixels will be given an output value of 0 and half will be given an output value of 255. According to the above-described error diffusion method, the surrounding pixels affect how errors are distributed. This can change the positional pattern of the two output values. More specifically, as pixels of the region B are successively binarized into output values, pattern B01 shown in FIG. 1(a) is first generated, and then pattern B02 shown in FIG. 1(b) is sometimes generated due to the errors distributed from preceding pixels. In pattern B01, pixels with output of "0," that is, white pixels, and pixels with output of "255," that is, black pixels, appear in complete alternation. In pattern B02, pixels with output of "0" and pixels with output of "255" are not in complete alternation. For this reason, an artificial border is generated at the transition between patterns B01 and B02.

SUMMARY OF THE INVENTION

It is an objective of the present invention to overcome the above-described problems and to provide an image processing device capable of preparing renditions of continuous tone images without generating boundaries.

In order to attain the objective and other objectives, the present invention provides an image processing device for quantizing a continuous tone image to produce pseudo-continuous tone image data, the device comprising: means for randomly setting a threshold value for each pixel of a continuous tone image; and means for subjecting input density data of each pixel of the continuous tone image to an error-diffusion quantization process with the threshold value set for the corresponding pixel, to thereby produce quantized output data for the corresponding pixel.

According to another aspect, the present invention provides a method of quantizing a continuous tone image to produce pseudo-continuous tone image data, the method comprising the steps of: randomly setting a threshold value for each pixel of a continuous tone image; and subjecting input density data of each pixel of the continuous tone image to an error-diffusion quantization process with the threshold value set for the corresponding pixel, to thereby produce quantized output data for the corresponding pixel. The error-diffusion quantization process step may be performed pixel by pixel for all the pixels of the continuous tone image. The error-diffusion quantization process step for an object pixel may include the steps of: modifying input density data of an object pixel by a sum of quantization errors distributed to the object pixel during error-diffusion quantization processes previously performed for at least one preceding pixel; comparing the modified input density of the object pixel with the threshold value set for the object pixel, thereby converting the input density data of the object pixel into the quantized output data; determining a quantization error between the modified input density data and the quantized output data; and distributing the quantization error to at least one subsequent pixel which has not yet been subjected to the error-diffusion quantization process.

According to a further aspect, the present invention provides an image processing device for quantizing a continuous tone image and producing pseudo-continuous tone image data comprising: threshold setting means for randomly setting, for each pixel of a continuous tone image, a threshold for quantization; and quantization processing means for quantizing, using an error diffusion method, density of each pixel in the continuous tone image. The quantization processing means may include: modified input density calculation means for determining modified input density by modifying density of each pixel of the continuous tone image by the sum of quantization errors distributed from surrounding pixels; output determining means for determining an output data of each pixel by comparing the modified input density with the corresponding threshold; quantization error calculation means for calculating, from the modified input density and the output data, a quantization error generated at each pixel; and quantization error distribution means for giving weight to the quantization error and distributing the quantization error to surrounding pixels.

BRIEF DESCRIPTION OF THE DRAWINGS

The above and other objects, features and advantages of the invention will become more apparent from reading the following description of the preferred embodiment taken in connection with the accompanying drawings in which:

FIGS. 1(a) and 1(b) illustrate how the positional pattern of two output values, produced from a uniform dense region through an error-diffusion binarization method, changes, in which FIG. 1(a) shows a pattern in which two output values are distributed in complete alternation and FIG. 1(b) shows a pattern in which two output values are not distributed in complete alternation;

DETAILED DESCRIPTION OF THE PREFERRED EMBODIMENT

Figure 1:
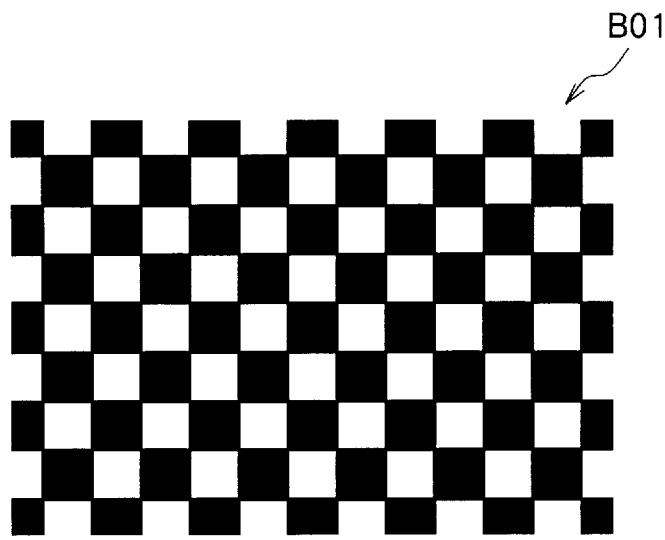
Figure 1:
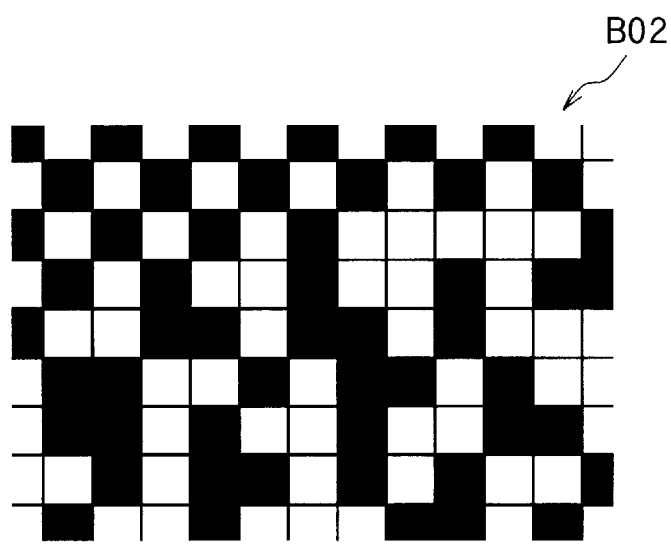

An image processing device according to a preferred embodiment of the present invention will be described while referring to the accompanying drawings wherein like parts and components are designated by the same reference numerals to avoid duplicating description.

Figure 2:
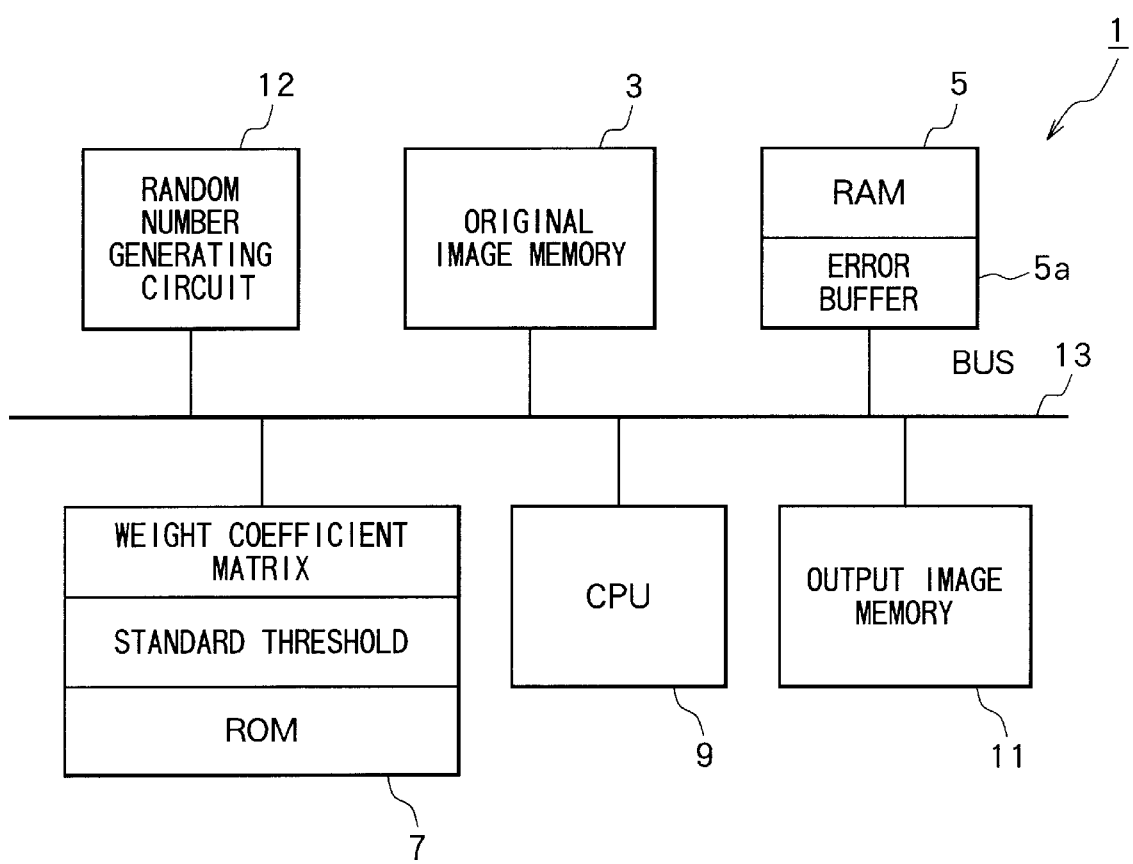
FIG. 2 is a block diagram of an image processing circuit according to an embodiment of the present invention.

FIG. 2 is a block diagram showing an image processing device or circuit 1 according to the present embodiment. The image processing circuit 1 is mounted in a bilevel device, such as a digital photoelectric copy machine, for forming images from presence or absence of dots. The image processing circuit 1 is for performing error-diffusion binarization processes characteristic to the present invention. The image processing circuit 1 is constructed from a computer, for example, and performs desired calculation processes on inputted data.

The image processing circuit 1 includes: an original image memory 3; a RAM 5; a ROM 7; a CPU 9; an output image memory unit (image memory) 11; and a random number generation circuit 12, which are connected via a bus line 13. Although not shown in the drawing, the bus line 13 is connected to an image input port (not shown) of an image pick-up device. Alternatively, the bus line 13 may be connected to an external memory that stores image data picked up by the pickup device. Continuous tone original image information picked up by the image pick-up device is inputted to the bus line 13 in the form of a digital electric signal (original image data). The original image data can be inputted via the bus line 13 in single pixel, line, or screen units.

The original image memory 3 is for temporarily storing at least a portion of the original image data successively transmitted from the bus line 13. The ROM 7 stores image processing programs including the binarization program shown in FIG. 3, a predetermined weight coefficient matrix α used for distributing or diffusing error developed during a binarization process, a predetermined value T0, and the like.

The weight coefficient matrix α is determined by the following equation (1):

$$\alpha = \begin{pmatrix} & & * & 7 & 5 \\ 3 & 5 & 7 & 5 & 3 \\ 1 & 3 & 5 & 3 & 1 \end{pmatrix} \quad (1)$$

The RAM 5 is for temporarily storing results of each calculation process. The RAM 5 has a plurality of weighted error buffers 5a each assigned to a corresponding pixel of the original image. Each weighted error buffer 5a is for accumulating errors, which are generated during binarization processes for nearby pixels and distributed to a corresponding pixel, and producing a weighted error sum E.

The CPU 9 is for performing various image processes, using the programs and data stored in the ROM 7 and the calculated results stored in the RAM 5. According to the present invention, the CPU 9 performs an error-diffusion binarization process of FIG. 3 on the original image data of the continuous tone image stored in the original image memory 3, to obtain output image data representative of a binary image for the continuous tone image. The output image memory unit (image memory) 11 is for temporarily storing the output image data. The random number generation circuit 12 is designed to generate a random number.

The bus line 13 is further connected to a printing portion (not shown) of the bilevel image forming device. The output image data is fed from the output image data memory 11 via the bus line 13 to the printing portion, where a binary image is formed from presence or absence of dots according to the output image data.

Next, while referring to FIGS. 2 and 3, procedures will be explained for binarizing the original image data into output image data using error diffusion. In the following example, pixel values of original image data are designated as one of 256 levels from 0 to 255.

Figure 3:
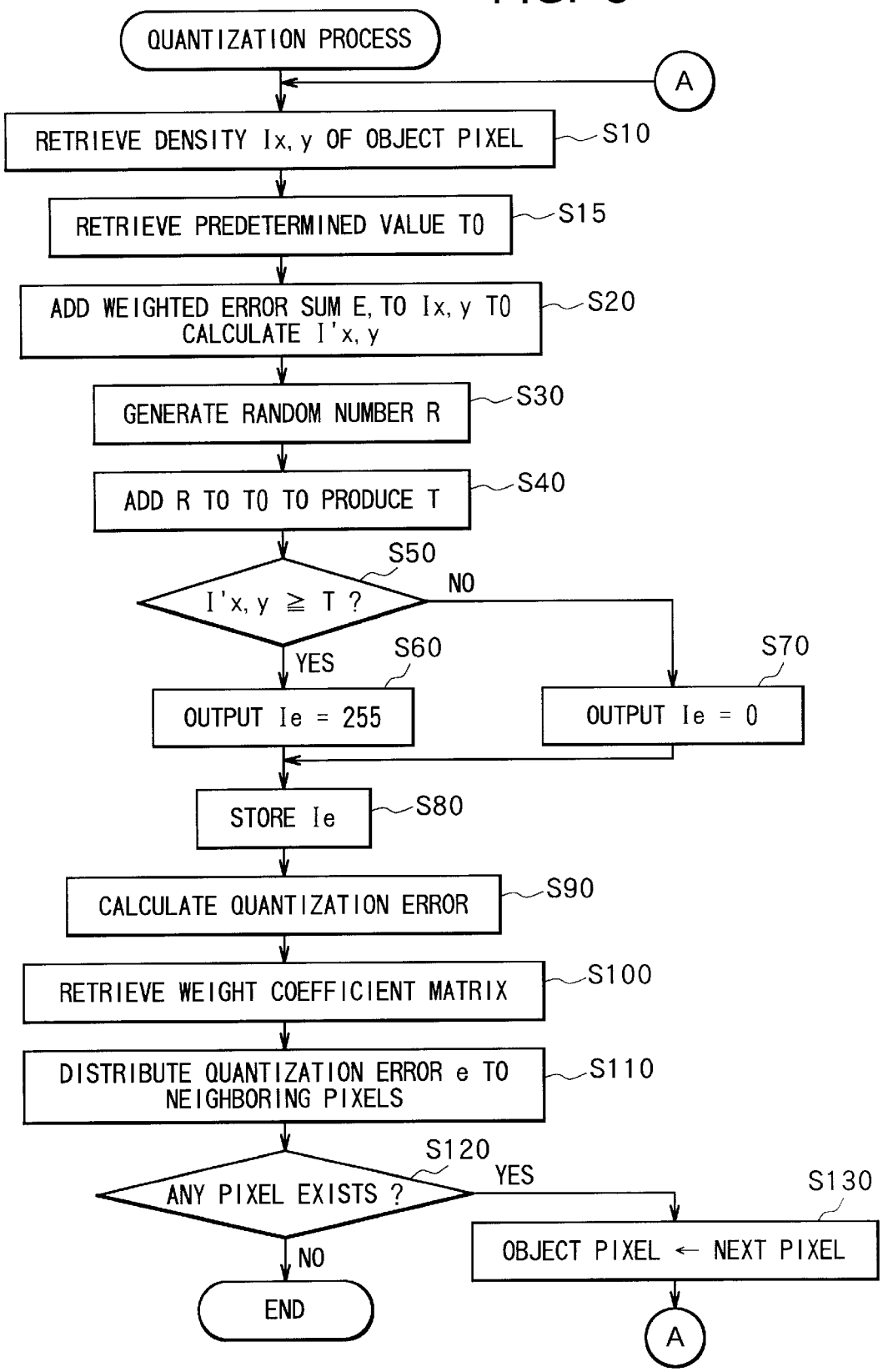
FIG. 3 is a flow chart of the binarization process performed in the image processing circuit of FIG. 2.

FIG. 3 is a flow chart representing procedures of binarization processes of the present embodiment. Data on the input density $I_{x,y}$ of a first object pixel is retrieved from the original image data that is stored in the original image memory 3 in step S10. Next, the predetermined value T0 is retrieved from the ROM 7 in S15.

Next, in S20, a weighted error sum E is retrieved from the weighted error buffer 5a for the object pixel. A modified input density $I'_{x,y}$ is calculated by adding the weighted error sum E to the input density $I_{x,y}$. The weighted error sum E is a value obtained by adding weighted errors distributed to the object pixel during processing of pixels preceding the object pixel. In more concrete terms, the weighted error sum E is a result of accumulation of weighted binarization errors which have been produced in steps S110 (to be described later) during binarization processes for nearby pixels conducted prior to the present binarization process for the object pixel.

Calculation of the modified input density $I'_{x,y}$ can be represented by the following equation (2):

$$I'_{x,y} = I_{x,y} + E \quad (2)$$

Next, a random number R is generated by the random number generation circuit 12 in S30. The random number R is for being added with the predetermined value T0 to produce a threshold value T(=T0+R) for the object pixel. The random number R is generated from a predetermined range. This range of random numbers R and the predetermined value T0 should be set to provide threshold values T(=R+T0) that are higher than the minimum value of input density ("0", in this example) and that do not exceed the maximum value of input density ("255", in this example). This is because if the threshold value T become lower than the minimum value of the input density, recording pixels (dots) will be generated even if the overall region has an input density value of "0."Contrarily, if the threshold value exceed the maximum value of the input density, a non-recording pixel will be generated even if the overall region has an input density value of "255."

When the input density ranges from 0 to 255, for example, the random number R should preferably be generated in the range from a number $n_1$ to a number $n_2$, where $-64 \leq n_1 \leq -20$ and $20 \leq n_2 \leq 64$. More preferably, the random number R should be within the range of −32 to 32. When the input density ranges from 0 to 512, for example, the random number R should preferably be within the range of −64 to 64.

The value T0 should be set to a predetermined value in accordance with the input density range and the random number generating range so as to provide threshold values T that are higher than the minimum value of input density and that do not exceed the maximum value of input density. In this example where the input density ranges from 0 to 255, the circuit 12 is designed to generate the random numbers R in the range of −32 to 32, and the value T0 is set to a predetermined value of 128.

Then, the threshold T for the object pixel is determined in S40 by adding the generated random number R to the predetermined value T0 as indicated below the equation (3):

$$T = T0 + R \quad (3).$$

In S50, the modified input density $I'_{x,y}$ is compared with the threshold T, and the value of a binary output Ie for the object pixel is determined in S60 or S70. That is, when the modified input density $I'_{x,y}$ is greater than or equal to the threshold T, the output value Ie is set to the value of "255" to produce a dot in S60. When the modified input density $I'_{x,y}$ is less than the threshold T, the output value Ie is set to the other value of "0" to produce a non-dot in S70. In this way, the determined output value Ie is stored in the output image memory unit 11 in S80.

Next, in S90, the binarization error (quantization error) "e" generated at the object pixel is determined by subtracting the output value Ie from the modified input density $I'_{x,y}$ as shown in the following equation (4):

$$e = I'_{x,y} - Ie \quad (4).$$

Figure 4:
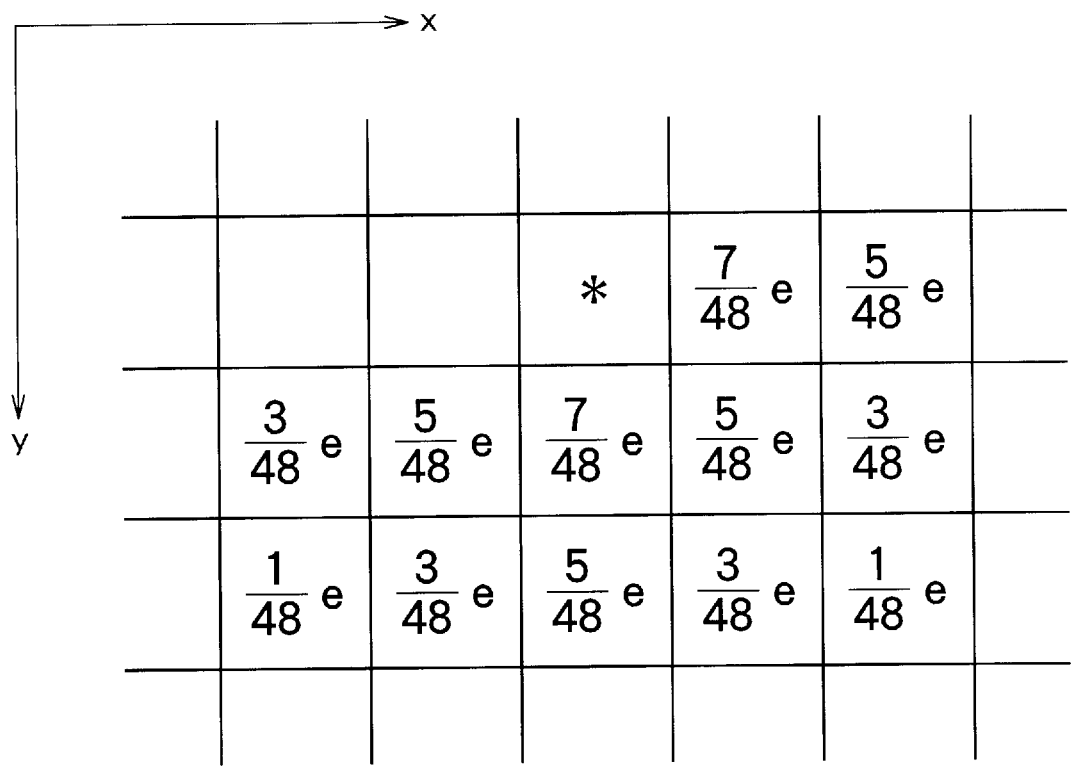
FIG. 4 illustrates the relationship between an object pixel and neighboring pixels, to which a binarization error produced at the object pixel are distributed.

In order to distribute the binarization error "e" of the object pixel to the subsequent neighboring pixels, first the weight coefficient matrix α represented by the equation (1) is retrieved from the ROM 7 in S100. The binarization error "e" generated in the object pixel is distributed to the neighboring pixels using the weight coefficient matrix α in S110. In this step, weight coefficients for pixels which are positioned in relation to the object pixel (represented by the asterisk *) as shown in FIG. 4 are obtained by calculating a ratio of each element of the weight coefficient matrix α (i.e., numerators) at a corresponding position to the total of all elements (i.e., the denominator). The coefficient is multiplied by the binarization error "e" of the object pixel. The product is added to the weighted error buffer 5a of the pixel at the corresponding position.

For example, a weight coefficient of 7/48 is obtained for the pixel to the adjacent right of object pixel * by dividing the element to the adjacent right of the object pixel * (i.e., 7) by the total of all elements in the matrix α of equation (1) (i.e, 48). Then, the resultant weight coefficient for the right adjacent pixel is multiplied by the binarization error "e". The product will be added to the buffer 5a for the pixel to the right of and adjacent to the object pixel.

This completes processes on the object pixel at the position with coordinates x, y. Next, whether or not there remain pixels which have not been processed is determined in S120. If there are, the pixel at the next coordinate is set as the object pixel in S130 and the above-described processes are repeated.

The pixel at the left in the uppermost line is processed first. Then, the other pixels in the uppermost line are processed pixel by pixel horizontally from left to right. The pixels in subsequent lines are processed successively following the same procedures as in the uppermost line. As a result, the lowest right pixel will be the last to be processed. Binarization processes are terminated when the above-described processes have been performed on all pixels.

The output image data constructed from the thus produced output data for all the pixels are temporarily stored in the output image memory 11 before being fed to the printing portion of the bilevel device.

As described above, in the present embodiment, an error-diffusion quantization process is conducted to all the pixels of a continuous tone image, pixel by pixel. In the error-diffusion quantization process to an object pixel, a threshold value T is randomly set for the object pixel. Input density data $I_{x,y}$ of the object pixel is modified by a sum of binarization errors E distributed to the object pixel during error-diffusion binarization processes previously performed for preceding nearby pixels. The modified input density $I'_{x,y}$ of the object pixel is compared with the threshold value T set for the object pixel, whereby the input density data of the object pixel is converted into a binarized output data Ie. A binarization error "e" between the modified input density $I'_{x,y}$ and the binarized output density Ie is determined. The binarization error "e" is distributed to subsequent nearby pixels, which have not yet been subjected to the error-diffusion binarization process, with the use of the weight coefficient matrix α.

Thus, according to the present invention, the threshold value that is used in the error-diffusion binarization process is randomly set. Therefore, boundaries can be prevented from being generated in any regions with a uniform input density, even if binarization error is distributed to neighboring pixels.

While the invention has been described in detail with reference to the specific embodiment thereof, it would be apparent to those skilled in the art that various changes and modifications may be made therein without departing from the spirit of the invention, the scope of which is defined by the attached claims.

For example, although in step S30 of the embodiment, random numbers were obtained using a random number generation circuit 12, random numbers could be obtained by a random number generation calculation processes in the CPU 9.

The image processing circuit 1 can be fixedly mounted to the bilevel image forming device. Alternatively, the image processing circuit 1 can be removably mounted to the bilevel image forming device.

In the above-described embodiment, the image processing device is constructed for binarizing an original continuous tone image to produce two output values ("0" and "255") for forming a binary image with a bilevel image forming device. However, the present invention can be applied to various multilevel image forming devices that can form an image constructed from more than two output values. The image processing device of the present invention can quantize an original continuous tone image to produce pseudo-continuous tone image data constructed from more than two output levels. The multilevel image forming device will form a pseudo-continuous tone image in accordance with the pseudo-continuous tone image data.

What is claimed is:

1. An image processing device for quantizing a continuous tone image to produce pseudo-continuous tone image data, the device comprising:

means for randomly setting a threshold value for each pixel of a continuous tone image, the threshold setting means including means for generating a random number for each pixel;

means for adding the random number to a predetermined value to thereby determine the threshold value for the corresponding pixel; and means for subjecting input density data of each pixel of the continuous tone image to an error-diffusion quantization process with the threshold value set for the corresponding pixel, to thereby produce quantized output data for the corresponding pixel.

2. The device of claim 1, further comprising:

means for temporarily storing input density data of pixels of the continuous tone image; and means for retrieving input density data of pixels one by one for error-diffusion quantization process, wherein in response to the retrieval operation of the retrieving means, the threshold setting means randomly sets a threshold value to the retrieved object pixel and the error-diffusion quantization process means subjects the retrieved object pixel to an error-diffusion quantization process with the set threshold value.

3. The device of claim 2, wherein the error-diffusion quantization process means includes:

means for modifying the retrieved input density data of the object pixel by a sum of quantization errors distributed to the object pixel during error-diffusion quantization processes previously performed for at least one preceding nearby pixel;

means for comparing the modified input density of the object pixel with the threshold value set for the object pixel, thereby converting the input density data into a quantized output data;

means for determining a quantization error between the modified input density data and the quantized output data; and means for distributing the quantization error to at least one subsequent nearby pixel which has not yet been quantized.

4. The device of claim 3, wherein the quantization error distributing means distributes the quantization error, according to a predetermined weight, to the at least one subsequent nearby pixel.

5. The device of claim 4, further comprising accumulating means assigned to each pixel for accumulating the quantization errors produced at the at least one preceding nearby pixel and distributed to the each pixel, thereby obtaining the sum of the quantization errors for the each pixel.

6. A method of quantizing a continuous tone image to produce pseudo-continuous tone image data, the method comprising the steps of:

generating a random number for each pixel;

adding the random number to a predetermined value to thereby determine a threshold value for the corresponding pixel; and subjecting input density data of each pixel of the continuous tone image to an error-diffusion quantization process with the threshold value set for the corresponding pixel, to thereby produce quantized output data for the corresponding pixel.

7. The method of claim 6, wherein the error-diffusion quantization process step is performed pixel by pixel for all the pixels of the continuous tone image.

8. The method of claim 7, wherein the error-diffusion quantization process step for an object pixel includes the steps of:

modifying input density data of an object pixel by a sum of quantization errors distributed to the object pixel during error-diffusion quantization processes previously performed for at least one preceding pixel;

comparing the modified input density of the object pixel with the threshold value set for the object pixel, thereby converting the input density data of the object pixel into the quantized output data;

determining a quantization error between the modified input density data and the quantized output data; and distributing the quantization error to at least one subsequent pixel which has not yet been subjected to the error-diffusion quantization process.

9. The method of claim 8, wherein the quantization error distributing step distributes the quantization error, according to a predetermined weight set, to the at least one subsequent pixel.

10. The method of claim 6, wherein the generating step, the adding step and the error-diffusion quantization process step are performed for all the pixels of the continuous tone image, one by one.

11. An image processing device for quantizing a continuous tone image and producing pseudo-continuous tone image data comprising:

random number generation means;

threshold calculation means for determining, for each pixel of a continuous tone image, a threshold for quantization by adding, to a predetermined value, a random number generated by the random number generation means; and quantization processing means for quantizing, using an error diffusion method, density of each pixel in the continuous tone image.

12. The image processing device of claim 11, wherein the quantization processing means includes:

modified input density calculation means for determining modified input density by modifying density of each pixel of the continuous tone image by the sum of quantization errors distributed from surrounding pixels;

output determining means for determining an output data of each pixel by comparing the modified input density with the corresponding threshold;

quantization error calculation means for calculating, from the modified input density and the output data, a quantization error generated at each pixel; and quantization error distribution means for giving weight to the quantization error and distributing the quantization error to surrounding pixels.

13. The device of claim 1, wherein the random number generating means generates the random number within a predetermined range, the predetermined range and the predetermined value being determined dependent on a range of the input density data of the continuous tone image.

14. The device of claim 5, wherein the random number generating means generates the random number within a predetermined range, the predetermined range and the predetermined value being determined dependent on a range of the input density data of the continuous tone image.

15. The method of claim 9, wherein the sum of the quantization errors for the object pixel is obtained through accumulating the quantization errors, produced at the at least one preceding nearby pixel and distributed to the object pixel.

16. The method of claim 15, wherein the random number is generated within a predetermined range, the predetermined range and the predetermined value being determined dependent on a range of the input density data of the continuous tone image.

17. The method of claim 6, wherein the random number is generated within a predetermined range, the predetermined range and the predetermined value being determined dependent on a range of the input density data of the continuous tone image.

18. The image processing device of claim 12, further comprising accumulating means assigned to each pixel for accumulating the quantization errors produced at the surrounding pixels and distributed to the each pixel, thereby obtaining the sum of the quantization errors for the each pixel.

19. The image processing device of claim 18, wherein the random number generation means generates the random number within a predetermined range, the predetermined range and the predetermined value being determined dependent on a range of the input density data of the continuous tone image.

20. The image processing device of claim 11, wherein the random number generation means generates the random number within a predetermined range, the predetermined range and the predetermined value being determined dependent on a range of the input density data of the continuous tone image.

* * * * *